United States Patent [19]

Michna et al.

[11] Patent Number: 5,145,485
[45] Date of Patent: Sep. 8, 1992

[54] PROCESS FOR THE PREPARATION OF STABLE DYESTUFF SOLUTIONS: PRESSURE PERMEATION IN PRESENCE OF BORIC ACID OR BORATE

[75] Inventors: Martin Michna, Pulheim; Werner Zillger, Hennef-Stein; Dietrich Tegtmeyer, Cologne, Fed. Rep. of Germany

[73] Assignee: Bayer Aktiengesellschaft, Leverkusen, Fed. Rep. of Germany

[21] Appl. No.: 665,630

[22] Filed: Mar. 6, 1991

[30] Foreign Application Priority Data

Mar. 15, 1990 [DE] Fed. Rep. of Germany ....... 4008262

[51] Int. Cl.$^5$ ..................... C09B 67/26; C09B 67/54
[52] U.S. Cl. ........................................... 8/527; 8/543; 8/549; 8/606; 8/630
[58] Field of Search ................... 8/527, 549, 630; 252/301.21

[56] References Cited

U.S. PATENT DOCUMENTS

| | | | |
|---|---|---|---|
| 4,072,463 | 2/1978 | Schlafer et al. | 8/527 |
| 4,689,048 | 8/1987 | Fortsch et al. | 8/524 |
| 4,702,744 | 10/1987 | Wolff et al. | 8/527 |
| 4,778,603 | 10/1988 | Koll et al. | 210/650 |
| 4,838,895 | 6/1989 | Galli et al. | 8/527 |
| 4,851,011 | 7/1989 | Lacroix et al. | 8/527 |

FOREIGN PATENT DOCUMENTS

| | | |
|---|---|---|
| 3842054 | 6/1990 | Fed. Rep. of Germany . |
| WO87/05046 | 8/1987 | PCT Int'l Appl. . |
| 1503764 | 3/1978 | United Kingdom . |
| 1506207 | 4/1978 | United Kingdom . |
| 2015018 | 9/1979 | United Kingdom . |

*Primary Examiner*—A. Lionel Clingman
*Attorney, Agent, or Firm*—Sprung Horn Kramer & Woods

[57] ABSTRACT

By adding boric acid or salts of boric acid before or during the pressure permeation of anionic dyestuff solutions, the filtration flux is substantially increased, resulting in a low-cost process, due to the shorter plant time required.

7 Claims, No Drawings

PROCESS FOR THE PREPARATION OF STABLE DYESTUFF SOLUTIONS: PRESSURE PERMEATION IN PRESENCE OF BORIC ACID OR BORATE

The present invention relates to a process for the preparation of highly concentrated aqueous solutions of anionic dyestuffs, in particular reactive dyestuffs. To obtain stable concentrated aqueous solutions of dyestuffs and white toners, it is often necessary to greatly diminish the salt content, such as obtained after synthesis and isolation. In industry, this is predominantly done by pressure permeation, by initially desalting, in which salt-containing permeate is discharged through a semipermeable membrane and replaced by deionized water. In many cases, this is followed by a concentration step, in which only permeate is discharged but no water is added.

In industrial processes, a 1- to 4-fold exchange of the original water volume is necessary for substantial desalting.

The costs for this process step essentially depend on the residence time in the pressure permeation plant. This time is determined by the amount of water, the surface area of the membrane and the filtration flux. At a given plant and taking into account the fact that, due to the flowability of the solution or suspension, a minimum amount of water is necessary, the economic efficiency depends greatly on the filtration flux. The higher the filtration flux, the lower the costs.

Surprisingly, it has been found that by adding boric acid or salts thereof before or during the desalting the filtration flux can be increased.

In a concentration step, if carried out afterwards, likewise an increased filtration flux is found.

Accordingly, the invention relates to a process for the preparation of stable, aqueous solutions of anionic dyestuffs, preferably reactive dyestuffs, by pressure permeation of solutions or suspensions of the crude dyestuff, characterized in that boric acid or salts thereof are added to the solution or suspension before or during the pressure permeation which comprises the steps desalination and, where appropriate, concentration.

The effect obtainable by this process is therefore surprising because the addition of electrolytes usually has no or a lowering effect on the filtration flux.

Apart from boric acid, salts of boric acid, such as the alkali metal salts, alkaline earth metal salts and ammonium salts, and trialkylammonium salts, the cations of which correspond to the formula

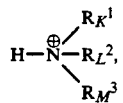

wherein
$R^1$ is $C_1-C_4$-alkyl
$R^2$ is $-(CH_2-CH_2-O)_nH$
$R^3$ is

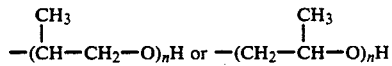

K is 0 to 2
L is 0 to 3
M is 0 to 3
K+L+M is 3
n is 1 to 4 are suitable.

Boric acid or salts thereof are present in the starting solutions before the pressure permeation in concentrations between 0.01 to 10% by weight, but preferably between 0.3 and 3% by weight.

When the process is carried out in practice, the procedure is such that, for example, lithium salts are added in solid form or as a concentrated solution to the reaction suspension present after the synthesis and already containing salts, resulting in the concentration of the salt in question necessary for a solution of the dyestuff.

Preferred lithium salts are $Li_2CO_3$, $LiHCO_3$, $LiNO_3$, Lithium citrate. LiOH is also suitable.

The (salts of) boric acid can also be added continuously during the pressure permeation whereby the concentration required is not changed.

Suitable dyestuffs to be processed to solutions stable on storage are anionic dyestuffs, but in particular reactive dyestuffs. Suitable reactive dyestuffs are all those having two or more identical or different reactive groups.

The reactive dyestuffs can belong to a wide range of classes, for example the series of metal-free or metal-containing mono- or polyazo dyestuffs, metal-free or metal-containing azaporphin dyestuffs, such as copper phthalocyanine, cobalt phthalocyanine, or nickel phthalocyanine dyestuffs, anthraquinone, oxazine, dioxazine, triphenylmethane, nitro, azomethine, metal-free or metal-containing formazan dyestuff.

In the context of this invention, the term "dyestuff" is, moreover, also understood to mean anionic white toners.

For the pressure-operated membrane separation operations of the process according to the invention it is generally possible to use symmetric, asymmetric and composite membranes having semipermeable properties. They can consist of organic materials as well as of inorganic materials. Organic materials are preferably polyvinylidene fluoride, cellulose acetate, polytetrafluoroethene, polyacrylonitrile, polyethylene imine, copolymers of polyacrylonitrile and vinyl pyrrolidone, polysulphone, polyamide, polyhydantoin, or hydrophilised polyolefins, based for example on polypropylene. Physicochemically or chemically modified membranes are also suitable, such as, for example, modified polyacrylonitrile membranes (cf. for example EP-A 25 973), which are obtained for example, by reacting the basic polymer with hydroxylamine, a polyfunctional, low molecular weight compound, a polymer containing reactive groups and an ionic compound which can undergo a chemical bond with the polymer, followed by treatment with active chlorine, for example in the form of a hypochloride solution. Inorganic membranes are those consisting of porous metal or metal alloys (so-called sintered metal membranes, made of, for example, porous steel) or those consisting of porous carbon, the surface of which can for example be coated with a thin layer of zirconium dioxide, silicon or aluminium oxide, or furthermore, those of porous glass or ceramics.

Preferably, in carrying out the process according to the invention, the solutions are subjected to pressure permeation through asymmetic membranes or composite membranes, in which salt-containing permeate is discharged and, if desired, replaced completely or in part by deionised water.

Preferably, the pressure permeation, that is reverse osmosis and ultrafiltration, is used in which the passage of water and any substances dissolved through the semipermeable membrane takes place under the driving force of a hydrostatic pressure exceeding the osmotic pressure.

The pressure permeation for the process according to the invention can be carried out on all commercially available pressure permeation apparatuses. These apparatuses can be designed, for example, as a plate, frame, tubular, hollow-fibre or hollow-fine-fibre module. The above mentioned membranes, usable according to the invention can be inserted into the modules described above.

The solutions prepared by the process according to the invention can be used, after the addition of a buffer and, if necessary, of one or more water-miscible organic solvents or solubilizing agents.

Examples of suitable agents are open-chain or cyclic amides, ureas, sulphones and sulphoxides, mono-and polyhydric alcohols and their ethers, polyethers and esters derived therefrom and dicyandiamide. If desired, these agents can also be added before the pressure permeation. However, in this case, part of the additives goes into the permeate during the pressure permeation.

In this manner, solutions stable on storage having a dyestuff content of 10–30% by weight are obtained, which are highly suitable for dyeing of sheet-like structures, predominantly textile substrates.

However, the solutions prepared by the process according to the invention can also be processed, if appropriate after addition of buffers and suitable additives, by spray-drying or other drying processes to give solid formulations. If desired, buffers and additives can also be added after the drying.

EXAMPLES

Example 1

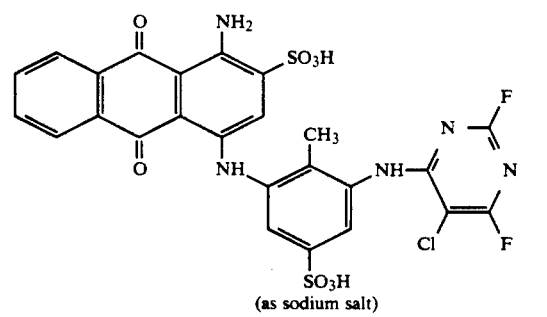

(as sodium salt)

935 kg of condensation liquor of the dyestuff of the formula (I) and 10 kg of boric acid are dissolved in 1,065 kg of LiHCO$_3$ (4%) at a temperature of about 35° C. The solution then contains LiHCO$_3$, process salts and 7.56% of pure dyestuff.

This solution is desalted at a temperature of about 30°–35° C., a pH of 6 and a pressure of 40 bar on a plate-and-frame module (containing a polysulphone membrane). For this purpose, 4,000 kg of salt-containing permeate are continuously replaced by 4,000 kg of deionized water and then concentrated by removing 1,118.4 kg of salt-containing permeate. 100.8 kg of ε-caprolactam and 20.2 kg of deionized water are added to 881.6 kg of concentrate, and the mixture is buffered with 5 kg of boric acid.

A liquid formulation of low viscosity and stable on storage of the dyestuff of the formula (I) containing 15% of pure dyestuff, 10% of ε-caprolactam, 0.5% of boric acid and water to make up to 100% is obtained.

The pH of the formulation is 7.5; Cl$^-$-content: <0.05%. Loss of dyestuff in the permeate: <0.05%.

The filtration flux $$\left[ J = \frac{kg}{m^2 \cdot d} \right]$$

was substantially higher in this example than in the same example without addition of boric acid before the pressure permeation.

Example 2

113.4 kg of condensation liquor of the dyestuff of the formula

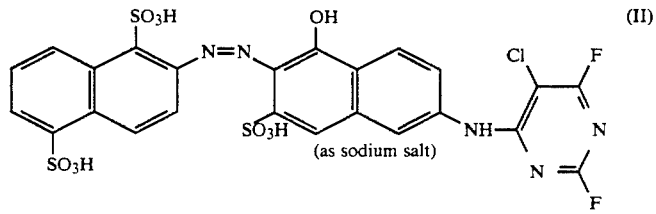

(as sodium salt)

and 1.1 kg of boric acid are dissolved in 113.4 kg of LiHCO$_3$ solution (4% strength) at a temperature of about 45°. The solution then contains 8.1% of pure dyestuff in addition to boric acid, LiHCO$_3$ and process salts.

This solution is dissolved at a temperature of about 40°–45° C., a pH of 7.5 and a pressure of 40 bar on a plate-and-frame module. For this purpose, 788.7 kg of salt-containing permeate are continuously replaced by 788.7 kg of deionized water and then concentrated by removing 133.9 kg of salt-containing permeate. The membrane used is a commercially available composite membrane (support: polysulphone, membrane layer: polyamide).

2 kg of dicyandiamide and 3.5 kg of deionized water are added to 94 kg of concentrate, and the mixture is buffered with 0.5 kg of boric acid.

A liquid formulation of low viscosity and stable on storage of the dyestuff of the formula (I) containing about 21% of pure dyestuff, 2% of dicyandiamide, 0.5% of boric acid and water to make up to 100% is obtained. The pH of the formulation is 7.5; Cl$^-$-content: <0.05%.

The filtration flux $$\left[ J = \frac{kg}{m^2 \cdot d} \right]$$

was substantially higher in this example than in the same example without addition of boric acid before or during the pressure permeation.

Example 3

53.3 kg of reaction liquor of the dyestuff of the formula

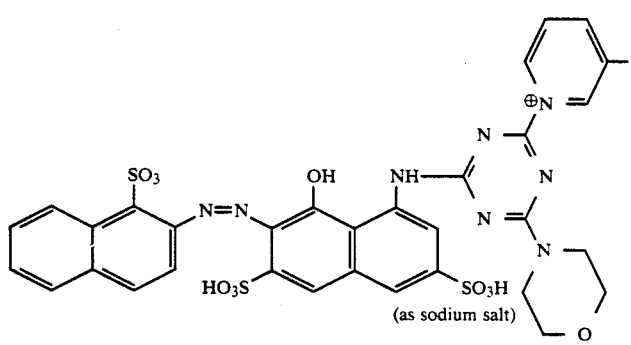

(III)

(as sodium salt)

are dissolved by adding 0.29 kg of boric acid and 1.82 kg of LiNO$_3$. The solution then contains about 8% of pure dyestuff. This solution is desalted at room temperature, a pH of 7.5 and a pressure of 40 bar on a plate-and-frame module.

For this purpose, 111.2 kg of salt-containing permeate are continuously replaced by 111.2 kg of deionized water and then concentrated by removing 30.1 kg of salt-containing permeate. 1.46 kg of deionized water are added to 25.5 kg of concentrate, and the mixture is buffered with 0.14 kg of boric acid.

A liquid formulation of low viscosity and stable on storage of the dyestuff of the formula (III) containing about 16% of pure dyestuff, 0.5% of boric acid, 2% of dicyandiamide and water to add up to 100% is obtained. The pH of the formulation is 7.5; Cl$^-$ content: <0.05%.

The filtration flux $$\left[ J = \frac{kg}{m^2 \cdot d} \right]$$

was significantly higher in this example than in the same example without addition of boric acid before the pressure permeation.

EXAMPLE 4

1 kg of boric acid is added to 189 kg of reaction suspension of the dyestuff of the formula

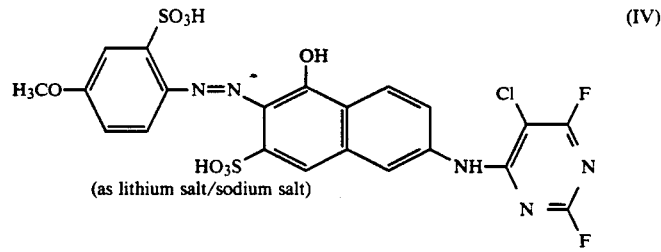

(IV)

(as lithium salt/sodium salt)

The suspension then contains 5.3% of pure dyestuff in addition to boric acid and process salts.

This suspension is desalted at a temperature of about 45° C., a pH of 7.5 and a pressure of 30 bar on a tubular module. In this process, 760 kg of salt-containing permeate are continuously replaced by 760 kg of deionized water and then concentrated by removing 95 kg of salt-containing permeate. The membrane used is a commercially available composite membrane (support: polysulphone, membrane layer: polyamide).

2 kg of dicyandiamide and 2.5 kg of deionized water are added to 95 kg of concentrate, and the mixture is buffered with 0.5 kg of boric acid.

A liquid formulation of low viscosity and stable on storage of the dyestuff of the formula (I) containing about 10% of pure dyestuff, 2% of dicyandiamide, 0.5% of boric acid and water to make up to 100% is obtained. The pH of the formulation is 7.5; Cl content: 0.05%.

The filtration flux $$\left[ J = \frac{kg}{m^2 \cdot d} \right]$$

was significantly higher in this example than in the same example without addition of boric acid before the pressure permeation.

We claim:

1. Process for the preparation of storage-stable aqueous solutions of anionic reactive dyestuffs and fluorescent whitening agents, by pressure permeation of solutions or suspensions of the crude dyestuff, characterized in that boric acid or salts thereof are added to the solution or suspension before or during the pressure permeation, which comprises the steps desalination and, where appropriate, concentration.

2. Process according to claim 1, characterized in that boric acid or salts thereof are added to the solution or suspension before or during the desalting step.

3. Process according to claim 1, characterized in that alkali metal salts, alkaline earth metal salts and/or ammonium salts of boric acid and/or trialkylammonium salts of boric acid, the cations of which correspond to the formula

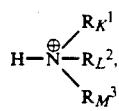

wherein $R^1$ is $C_1$-$C_4$-alkyl, $R^2$ is $-(CH_2-CH_2-O)_nH$ $R^3$ is

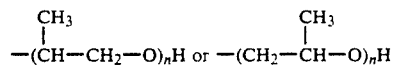

K is 0 to 2
L is 0 to 3
M is 0 to 3
K+L+M is 3
n is 1 to 4, are used.

4. Process according to claim 1 characterized in that boric acid or salts thereof are added to the solution or suspension, before pressure permeation, in concentrations between 0.01 and 10% by weight.

5. Process according to claim 1 characterized in that anionic reactive dyestuffs are used in the form of their alkali metal salts, a portion of the alkali metal ions being present as lithium.

6. Process according to claim 1 characterized in that reactive dyestuffs of the fluorotriazine and fluorochloropyrimidine series are used.

7. Process according to claim 1 characterized in that the storage-stable aqueous dyestuff solutions have a dyestuff content of 10-30% by weight.

* * * * *

UNITED STATES PATENT AND TRADEMARK OFFICE
CERTIFICATE OF CORRECTION

PATENT NO. : 5,145,485

DATED : September 8, 1992

INVENTOR(S) : Michna et al.

It is certified that error appears in the above-identified patent and that said Letters Patent is hereby corrected as shown below:

Col. 1, lines 54-57, Delete " 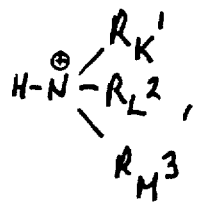 " and substitute

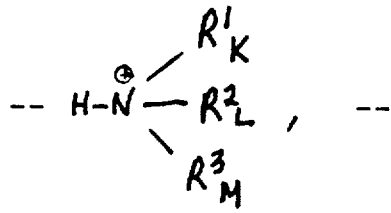

Col. 7, lines 15-18, Delete " 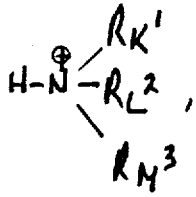 " and substitute

UNITED STATES PATENT AND TRADEMARK OFFICE
CERTIFICATE OF CORRECTION

PATENT NO. : 5,145,485

DATED : September 8, 1992

INVENTOR(S) : Michna et al

It is certified that error appears in the above-identified patent and that said Letters Patent is hereby corrected as shown below:

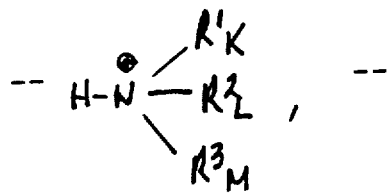

Signed and Sealed this

Twenty-second Day of March, 1994

*Attest:*

BRUCE LEHMAN

*Attesting Officer*     Commissioner of Patents and Trademarks